UNITED STATES PATENT OFFICE.

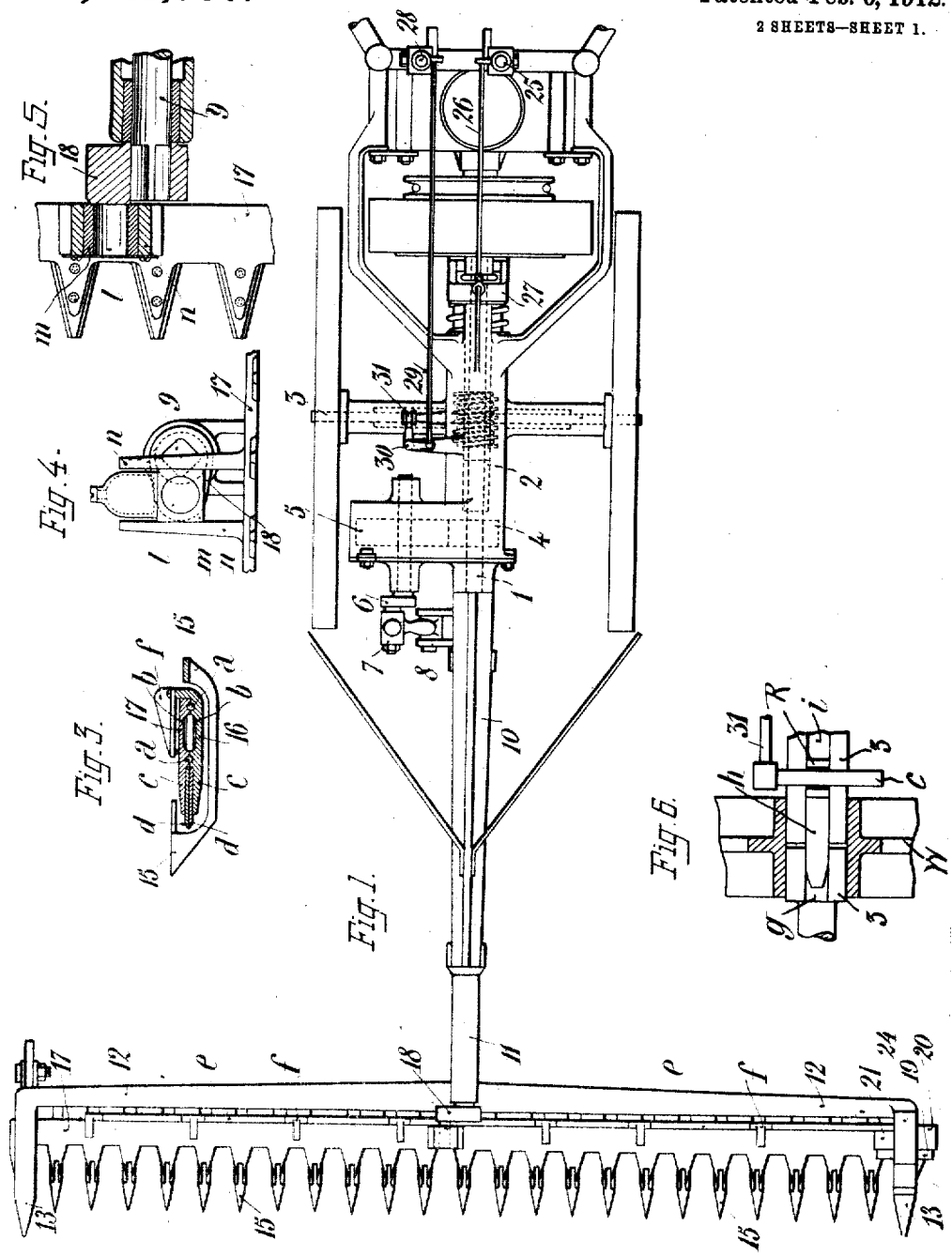

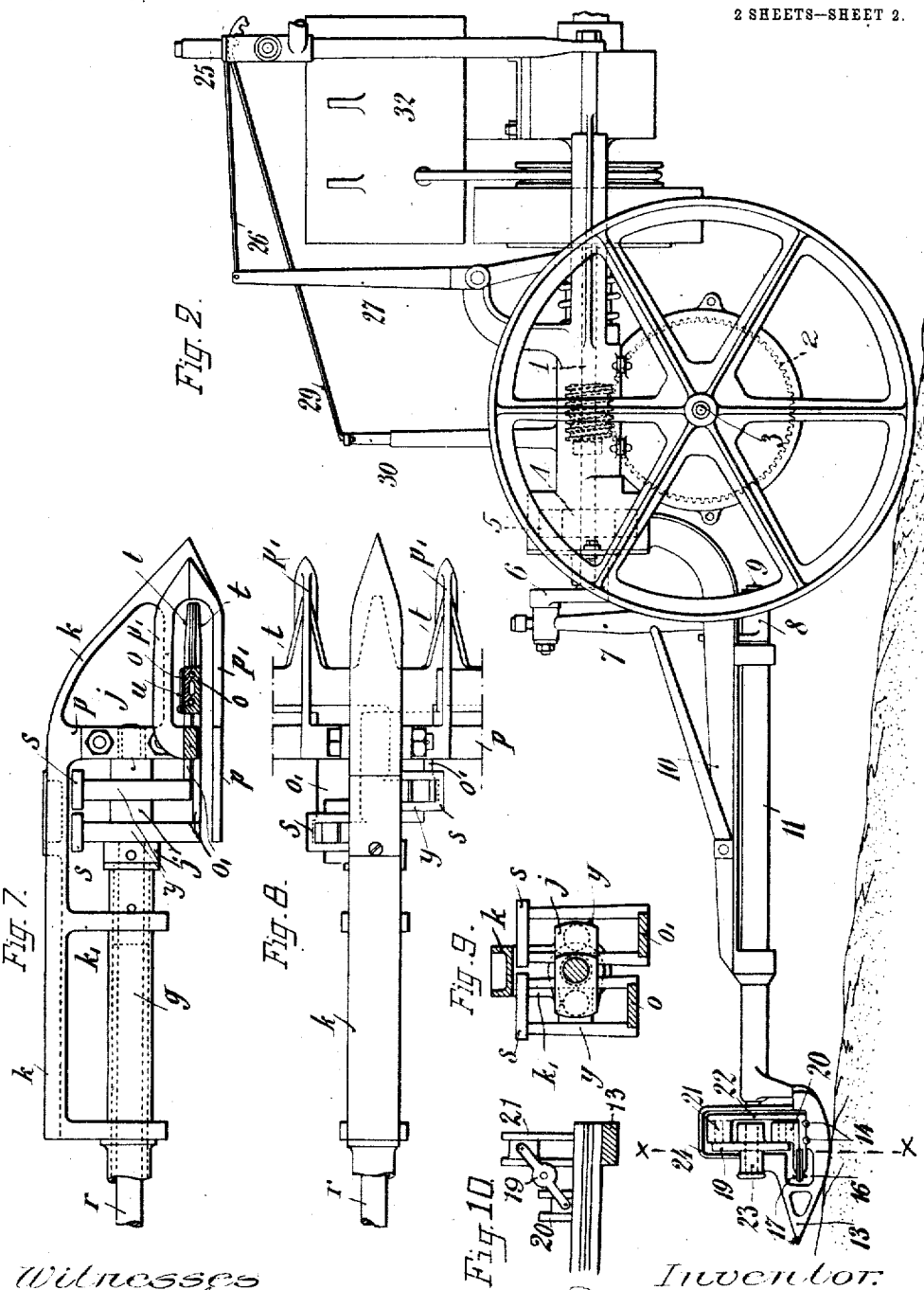

JEAN SULLIGER, OF GENEVA, SWITZERLAND.

MOWING-MACHINE.

1,016,586.  Specification of Letters Patent.  Patented Feb. 6, 1912.

Application filed August 5, 1909. Serial No. 511,471.

*To all whom it may concern:*

Be it known that I, JEAN SULLIGER, a citizen of the Republic of Switzerland, and residing at Geneva, Switzerland, have invented new and useful Improvements in Mowing-Machines, of which the following is a specification.

This invention relates to certain new and useful improvements in mowing machines.

The invention has for its object the production of a machine of this character in which both of the cutter bars are reciprocated.

A further object is to provide improved means for operating said cutter bars. With these ends in view the invention will be hereinafter fully set forth and particularly pointed out in the claims.

In the accompanying drawings:—Figure 1 is a plan view of a mowing machine constructed in accordance with my invention. Fig. 2 is a side view thereof. Fig. 3 is a detail sectional view illustrating the cutters. Figs. 4 and 5 are details of the actuating mechanism for the reciprocating cutter bar. Fig. 6 is a detail of the clutch controlling the operation of the cutter bars. Fig. 7 is a side view partly in section, and Fig. 8 is a plan view of a modified form of knife driving apparatus. Fig. 9 is a detail sectional view thereof. Fig. 10 is a detail sectional view on line $x$—$x$ Fig. 2.

Referring to the drawings, 1 designates a power shaft driven by a motor 32 and provided with a worm meshing with gear 2 carried by the axle 3 of a suitable supporting frame. Said drive shaft is provided with a pinion 4, meshing with a gear 5 driving a crank 6 which is connected by link 7 with the crank 8 of a shaft 9, rotatably mounted in a support 10. Said support is prolonged to form the horizontal support 11 which is provided with the lateral arms 12, the free ends of which are supported by the shoes 13. These arms 12 also support the finger bar 15 upon which the cutter bars 16 and 17 are mounted to reciprocate. Each cutter bar comprises a blade $c$ on which the edged teeth $d$ are secured. (See Fig. 3.) The blades are hollow and provided with strengthening ribs $b$ and two ranges of grooves to receive antifriction balls $a$, said blades being held in operative relation by means of overhanging guides $f$ carried by a rib $e$ formed with the lower blade.

The shaft 9 is provided with a crank 18 provided with the arm $l$ engaging a slide $m$ mounted to reciprocate in guides $n$ formed with the upper cutter bar, whereby said upper bar is reciprocated. One end of said bar is provided with a slide connected with a lever 19 pivoted to a pin 23 carried by one of the shoes 13, said slide being mounted in guides 20, the other end of said lever being connected to a slide mounted between guides 21 of a projection 22 of the lower knife. In this manner the lower cutter is reciprocated simultaneously with the reciprocation of the upper cutter but in the opposite direction. In order to stiffen the shoe against the strains incident to this arrangement a suitable brace 24 is provided.

The connections with the motor are controlled by a suitable clutch operated by lever 27 connected by means of a cable 26 with a hand lever 25. A hand lever 28 is connected to one end of a cable 29 the other end of the latter being connected to a bell crank connected to a rock shaft 30. Said rock shaft is connected by means of a second bell crank with a rod 31. Said rod is provided with a finger $c$ which engages the ring R of movable clutch member $h$ slidably mounted in a groove $g$ of the axle 3 which latter is provided with a complemental clutch portion within the hub of wheel W and adapted to be moved by movable member $h$. By this arrangement the wheel W may be driven from motor 32 or not, as may be desired.

In Figs. 7, 8, and 9 I have illustrated a modified mechanism for the driving of the knives. In this form the cranks of the crank axle $j$ which is driven by the motor axle $r$, are surrounded by the pieces $y$ connected by arms $o'$ with the knives $o$. The tube $g$ within which the axle $r$ is mounted, is made integral with the frame of the carriage, and bears the support $k$ by means of rings $k'$; on both sides of this support are bolted the lateral arms $p$ and $p$ provided all along with the protecting points $p'$ and with shoes at their free extremities. The teeth edges $t$ are riveted on the sawlike blades of the knives $o$ which are kept one against the other by means of the guiding plate $u$ which extends itself on the whole length of the arm. The pieces $y$ are stiffened by means of the pieces $s$.

I claim as my invention:—

1. Cutting mechanism for mowing machines comprising upper and lower cutter bars, guide fingers for one of said bars carried by the other bar, a slide carried by one of said bars, means engaging said slide for reciprocating said bar, and means operated by said bar for reciprocating the other bar.

2. Cutting mechanism for mowing machines comprising upper and lower cutter bars, supporting shoes therefor guide fingers for one of said bars carried by the other bar, a slide carried by one of said bars, a drive shaft provided with a crank engaging said slide to reciprocate said bar, a lever supported by one of said shoes adjacent one end of the last mentioned bar and connected with the latter, and connections between said lever and the end of the other bar.

3. Cutting mechanism for mowing machines comprising upper and lower cutter bars, supporting shoes therefor guide fingers for one of said bars carried by the other bar, means for reciprocating one of said bars, a lever pivotally supported by one of said shoes, and slides carried by each bar and operatively connected with the opposite ends of said lever.

4. Cutting mechanism for mowing machines comprising upper and lower cutter bars, guide fingers for one of said bars carried by the other bar, guide bars carried by one of said cutter bars, a slide mounted between said guide bars, a crank shaft connected to said slide, and means operated by said cutter bar for actuating the other cutter bar.

5. Cutting mechanism for mowing machines comprising upper and lower cutter bars, guide fingers for one of said bars carried by the other bar, guide bars carried by one of said cutter bars, a slide mounted between said guide bars, a crank shaft connected to said slide, a projection carried by the other cutter bar and provided with guide arms, a slide mounted between said guide arms, and a lever engaging said slide and operatively connected with the other bar.

6. Cutting mechanism for mowing machines comprising upper and lower cutter bars, the lower bar being provided with a longitudinal rib, guide fingers for the upper bar secured to said rib, means for reciprocating the upper bar, and means operated by the upper bar for reciprocating the lower bar.

In testimony, that I claim the foregoing as my invention, I have signed my name in presence of two subscribing witnesses.

J. SULLIGER.

Witnesses:
L. H. MUNIER,
J. VULLIN.